Aug. 23, 1966     W. E. REJESKI     3,267,560
METHOD FOR FLARING A COLLAPSIBLE TUBE
Filed Feb. 26, 1962     2 Sheets-Sheet 1
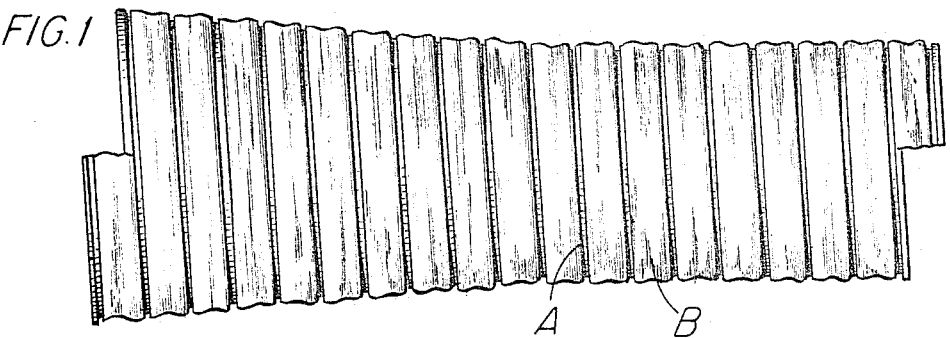
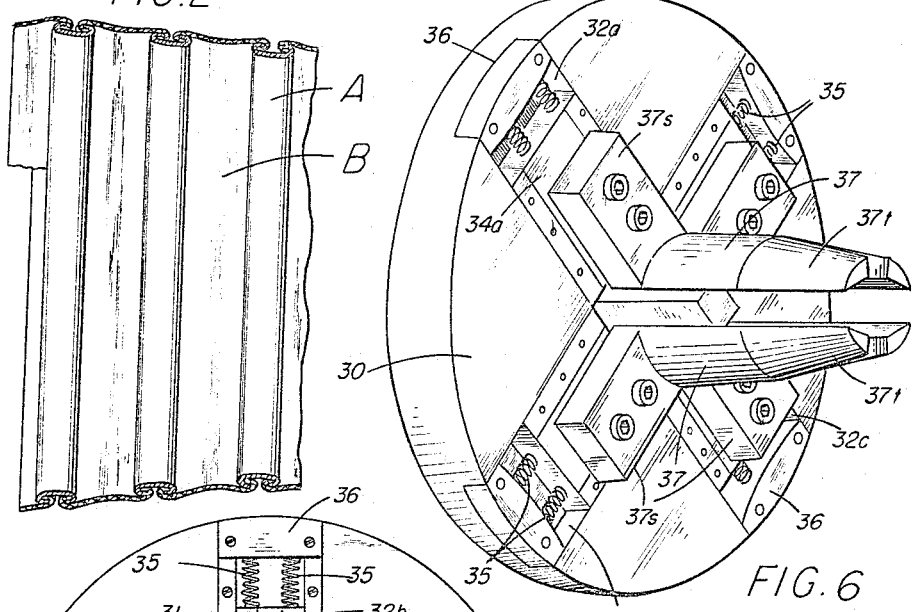
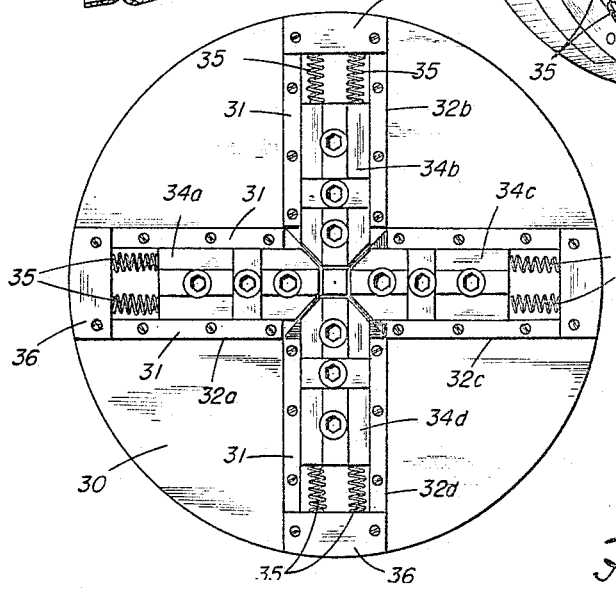
INVENTOR.
William E. Rejeski
BY his attorneys
Howson and Howson

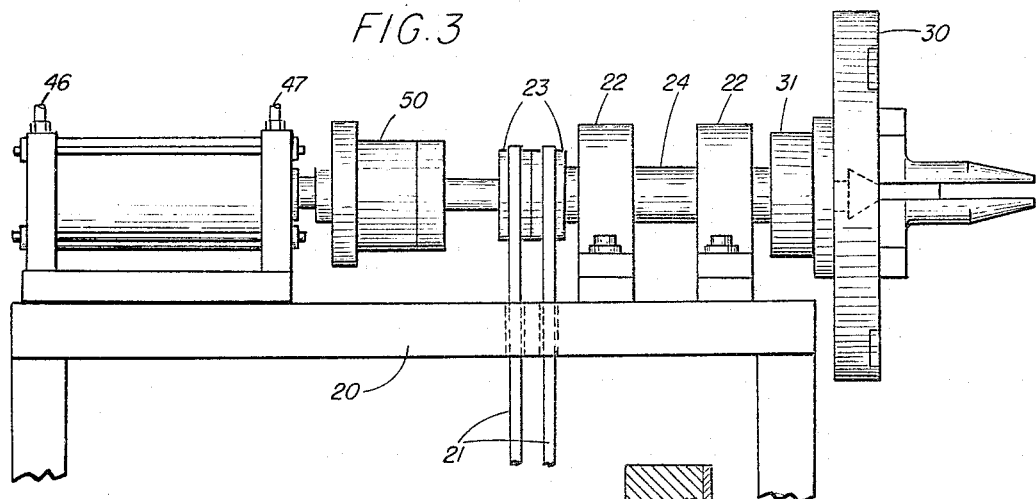
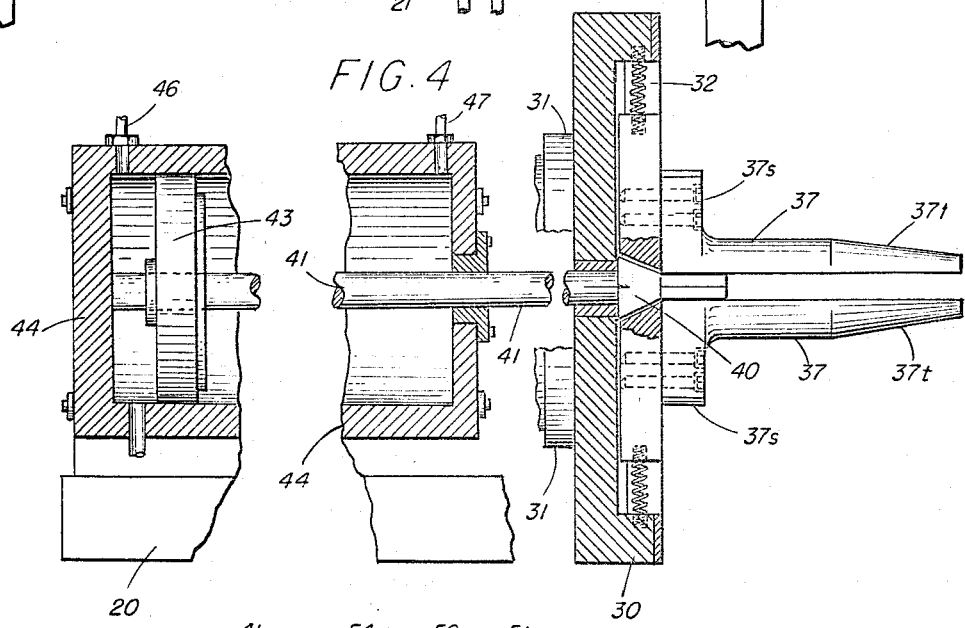
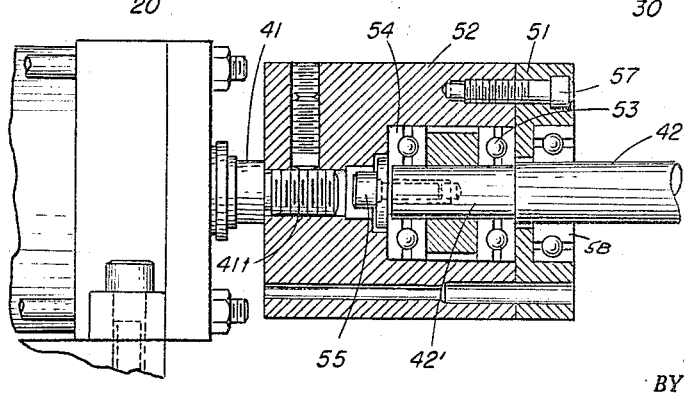

United States Patent Office 3,267,560
Patented August 23, 1966

3,267,560
METHOD FOR FLARING A COLLAPSIBLE TUBE
William E. Rejeski, Farmington, Conn., assignor to The Wiremold Company, West Hartford, Conn., a corporation of Connecticut
Filed Feb. 26, 1962, Ser. No. 175,544
4 Claims. (Cl. 29—157)

This invention relates to collapsible tubing and machines and methods for making the same. More particularly, it relates to collapsible tubing with an expanded end in which the diameter progressively increases from a given diameter of the main body of the tubing toward the end of the length of tubing.

Tubing of the type disclosed in the A. E. Chernack Patent 2,417,676 has been made and used widely for many years. On many occasions, a need has been felt for an enlarged or expanded end or ends on lengths of such tubing. Heretofore, no such tubing was available, nor was a machine or method for making the same.

It is an object of this invention to provide a method to manufacture collapsible tubing with progressively expanded end portions.

Another object of the invention is to provide a machine for expanding the end portion of a fabricated cut length of collapsible tubing to increase the diameter progressively from the body toward the extremity of the tubing.

Another object is to provide collapsible tubing with an expanded end or ends as a new article of manufacture.

Other objects and advantages of the invention will become apparent as it is described in connection with the accompanying drawings.

In the drawings:

FIG. 1 is an elevational view of tubing formed according to the invention.

FIG. 2 is a section view through the expanded end of the tubing as shown in FIG. 1.

FIG. 3 is a side elevation view of a machine for expanding the end of collapsible tubing according to the invention.

FIG. 4 is a broken vertical section view through the head and hydraulic cylinder of FIG. 3.

FIG. 5 is an end elevational view of the expansion head with the expandable arms removed.

FIG. 6 is a perspective view of the head and expandable arms used in the machine as illustrated in FIGS. 3 and 4.

FIG. 7 is a vertical section view through the coupling between the piston and thrust rods.

Referring to the drawings, tubing of the type disclosed in said Chernack patent is made of two elements, one (which may be considered as a form-giving element) being a helical metal spiral A formed from a flat metal strip whose edge portions are reversely bent and pressed against the edges of a fabric or plastic or other flexible strip B to frictionally hold the edges of the flexible strip. One edge of the flexible strip is folded under and gripped by the reversely bent edge of one convolution A of the metal strip, while the other edge of the flexible strip is folded under and held by the opposite reversely bent edge of the adjacent convolution B of the metal strip. Thus, the flexible strip is frictionally held along both its edges by the edges of the metal helical strip.

To gradually expand the end convolutions of a length of tubing to an enlarged mouth, a machine as shown in FIGS. 3–6 may be used.

On a machine frame or stand 20 are mounted spaced horizontal bearings 22 in which is rotatably mounted a hollow horizontal shaft 24. For driving shaft 24, a pulley 23 is mounted on one end and driven by belts 21 from a motor through reduction gearing (not shown). On the opposite end of the shaft 24 is a large disc-shaped head 30.

In the outer face of the head 30, two pairs of diametrically aligned radial channels 32a and 32c and 32b and 32d are formed, the channels 32a, 32c being in alignment while 32b and 32d are also in alignment and at right angles to the channels 32a and 32c.

In each channel, a member 34a, 34b, 34c or 34d, respectively, is slidable. The slides are held in the channels by overlapping edge bars 31 or in other suitable fashion. To press the slides radially inward, a pair of springs 35, respectively, press at one end on each slide and at their other ends against an end block 36, one block being received in the end of each channel.

The opposite ends of the slides are tapered and truncated and the inner surface of the truncated ends are chamfered or beveled from the point toward the periphery of the head 30 and toward the bottom of the channel in which each slide moves.

In order to move the slides radially outward in these channels against the pressure of the spring 35, a cam head 40 is provided on the end of a rod 42 slidable axially within the hollow shaft 24. This cam head is in the shape of a truncated four-sided pyramid, the angularity of whose sides is the same as the angularity of the bevel on the ends of the radial slides 34a–34d so that when the head 40 is moved axially outward, it will move the slides radially outward by a camming action.

In order to expand the ends of the tubing, four identical expansion arms 37 are mounted, one each on the slides 34a–34d to extend parallel to the axis of rotation of the head 30, shaft 24 and rod 42. The ends of the arms converge or taper toward said axis of rotation from a point midway along their length. The opposite ends of the arms 37 are provided with shoulders 37s which extend radially outward and are bolted, respectively, to the slides 34a–34d. Those surfaces of these arms 37 which extend parallel to the axis of rotation are curved complementally so that in their innermost position, they form portions of a substantially cylindrical surface about the axis of rotation.

The arms 37 may be replaced by other arms of similar configuration and construction but of different size and radius of curvature on their cylindrical surfaces, for use with tubing having larger or smaller diameters.

For moving the arms 37 outwardly, the rod 42 is axially movable by a pneumatic piston 43 mounted on a piston rod 41 beyond and aligned with the opposite end of the rod 42 and located in a cylinder 44 which is mounted on the machine frame 20.

Ports 46 and 47 adjacent the opposite ends of the cylinder may be provided for the admission of air on either side of the piston.

The connection between piston rod 41 which moves axially but does not rotate and cam rod 42 which moves both axially and rotatively is by a coupling designated generally by numeral 50. This coupling comprises, a two part non-rotating housing which is axially received and tapped at one end for a threaded end 41t on piston rod 41 between the larger part 52 of the coupling are two axial-thrust ball bearings 53, 54 through which a reduced end portion 42' of rod 42 passes. Into the end of rod 42 a cap screw 55 is threaded with its flange engaging the thrust bearing 54. The shoulder between the shaft 42 and its reduced end 42' engages the other thrust bearing 53. The bearings 53, 54 are held within the larger part 52 of the housing by an annular cap or end part 51 that is secured by one or more longitudinal bolts 57 or dowel pins. The cap 51 preferably contains a horizontal ball bearing 58 in which rod 42 rotates.

When it is desired to expand the end of a section of cylindrical collapsible tubing, the operator starts up the machine and grasps the tubing in his hands and holds it at all times from rotating. The starting of the machine causes the head 30, slides 32a–32d and their arms 37, and also the rod 42 and cam head 40, to rotate. The speed of rotation is insufficient to cause the slides 32a–32d to slide outwardly by centrifugal force against pressure of springs 35a–35d. The operator now places the tubing over the arms 37, the diameter of the arms in their contracted or innermost position being equal to or preferably slightly less than the inner diameter of the tubing. Then the operator by a foot control (not shown) operates a valve which permits the air gradually to enter the cylinder 44 behind the piston 43 and to press the piston and rod 41 and, in turn the rod 42 and the cam head 40 outwardly, i.e., to the right in FIG. 4.

The movement of the cam head 40 causes radially outward movement of the slides and of the arms 37 carried thereby. The revolving head and arms cause a spinning action which, by frictional engagement with the fabric within the collapsible tubing, forces the fabric to slip within the metallic helical element at the same time that the end portion of the helix is gradually expanded.

The expansion progressively increases from the point of first engagement of the arms 37 with the interior of the collapsible tubing toward the end of the tubing. Thus, the diameter of the end portion of the tubing is gradually increased up to the enlarged mouth at the extremity of the tubing, as illustrated in FIG. 1.

The unique construction of the tubing, in which the flexible strip edges are frictionally held and the metal strip can be given a permanent set, enables the machine to expand the end of the length of tubing in the desired amount and in the form as previously indicated and results in a gradually increased or enlarged end portion which will retain its enlarged condition after the operation is completed. The head must necessarily rotate in a direction tending to "unwind" the tubing. If the rotation was in the opposite direction, the head and tubing would tend to wind up and bind on the arms 37 and would fail to produce the desired result.

As previously indicated, the machine and method just described can be applied to collapsible tubing of various sizes and diameters. This can be done by use of the arms 37 and a cam head 40 of proper size and dimension so as to cause expansion of the particular size of tubing which is being worked.

The end portion of the tubing, after having been expanded, can be shaped to fit many forms other than round. Thus, the invention provides a means for producing tubing which permits gradual transition from one shape to another, that is to say from a cylindrical body to an eliptical, rectangular, hexagonal, octagonal or other shape mouth without materially impeding or changing the volume or rate of fluid flow through and from the tubing. This is a valuable characteristic when the tubing is used, for example, in air conditioning or similar equipment or in the automotive field or any other industrial applications.

If the tubing were of uniform diameter right up to its end, the variation into any form other than circular would be accompanied by a reduction in cross-sectional area and, hence, an impediment to the flow of air or other fluid through the tubing would result.

When the operator has completed the expansion of the end of the tubing, he withdraws his foot from the control causing air to enter the opposite end of the cylinder. This, in conjunction with the springs 35 which act directly upon the slides 34a–34d, causes the slides to return to their innermost position, thereby releasing the tubing.

The method thus involves expanding the end portion of a length of collapsible tubing, desirably two element tubing of the type comprising a metal helically wound strip whose edges frictionally hold a flexible strip between adjacent convolutions, by increasing the diameter of the helical metal strip progressively along its length from a point near the extremity of the tubing up to the extremity, and simultaneously increasing the diameter of the helix comprised of the flexible strip, and causing the flexible strip to move with respect to the helical metal strip within the frictional hold of the latter during such expansion.

From the foregoing, it will be apparent that the invention provides a new method and machine for expanding the end of collapsible tubing in order to produce a divergent enlargement of the end portion of a length of tubing and, hence, provides a needed new and useful article of manufacture.

Although a preferred embodiment of the invention is illustrated and described, it will be understood that the invention is not limited to such embodiment. Any other suitable means may be employed to move the shaft 41 axially, in lieu of the cylinder and piston shown, which indeed could be hydraulically instead of pneumatically actuated; or the shaft 41 could be pushed and pulled by hand.

Also, the invention is not limited to expanding tubing by generating a truncated conical surface of revolution by tapering arms 37, as shown. Instead, the arms may be shaped to generate spherical, hemispherical, eliptical and other surfaces of revolution to expand the tubing at its ends or between its ends into such shapes.

Since many modifications within the scope of the invention will occur to those skilled in the art, the invention should not be considered limited to the specific embodiment illustrated and described.

What is claimed is:

1. The method of expanding a plurality of convolutions of a length of collapsible tubing of the type which is comprised of a resilient helical form-giving strip whose edges are reversely bent and a flexible strip whose edges are clamped between and frictionally held by the edges of adjacent convolutions of the helical strip, the steps of causing the flexible strip to move to a new permanent position with respect to and within the clamping edges of the helical strip while simultaneously expanding the helical strip from a point along the body of the tubing to another point along the tubing, the edges of said flexible strip in said new position remaining clamped between the edges of the form-giving strip.

2. The method of expanding a plurality of convolutions at the end portion of a length of collapsible tubing of the type comprising a resilient helically wound form-giving strip whose edges frictionally hold a flexible strip between adjacent convolutions of the helix, the steps of increasing the diameter of the helix progressively along its length from a point several convolutions from the extremity of the tubing up to the extremity, and simultaneously causing the edges of the flexible strip to move along the helical strip to a new permanent position within the frictional hold of the strip during such expansion.

3. The method of expanding a plurality of convolutions of a length of collapsible tubing of the type which is comprised of a resilient helical form-giving strip whose edges are reversely bent and a flexible strip whose edges are clamped between and frictionally held by the edges of the adjacent convolutions of the resilient strip, the steps comprising frictionally engaging the inward folds of the flexible strip of a portion of the length of the tubing with a constantly rotating member while holding the remaining portion of the tubing stationary, and thereby causing the flexible strip to move peripherally of the tubing within the clamping edges of the helical strip, and simultaneously expanding those convolutions of the helical strip with respect to which said flexible strip has moved into a helical spiral of progressively increasing diameter.

4. The method of expanding a plurality of convolutions of a length of collapsible tubing of the type which is comprised of a resilient helical form-giving strip whose edges are reversely bent and a flexible strip whose edges are clamped between and frictionally held by the edges of the adjacent convolutions of the resilient strip, the steps comprising holding a portion of the length of the tubing stationary while applying a constant rotary radially-expanding force to the remaining portion of said tubing causing a series of convolutions of the helical strip to expand into a helical spiral of progressively increasing diameter, and simultaneously applying said rotary force frictionally to the inner folds of the flexible strip adjacent the expanding helical convolutions in a direction tending to unwind the tubing to cause the flexible strip to move peripherally of the tubing within the clamping edges of the helical strip.

References Cited by the Examiner
UNITED STATES PATENTS

| | | | |
|---|---|---|---|
| 892,981 | 7/1908 | Cunningham | 153—82 |
| 1,076,592 | 10/1913 | Manning | 29—542 |
| 1,138,311 | 5/1915 | Pollard | 153—82 |
| 1,440,508 | 1/1923 | Todd | 285—149 |
| 1,649,491 | 11/1927 | Schmid | 153—82 |
| 1,696,229 | 12/1928 | Frantz | 29—542 |
| 1,827,086 | 10/1931 | Hunter | 285—128 X |
| 1,890,077 | 12/1932 | Elting. | |
| 2,592,335 | 4/1952 | Rejeski | 138—135 |
| 2,672,175 | 3/1954 | Howard | 153—80 |
| 2,800,705 | 7/1957 | Ingalls et al. | 113—35 X |
| 2,841,183 | 7/1958 | Rejeski | 138—135 |
| 2,943,667 | 7/1960 | Ewing et al. | 153—80 |
| 2,991,674 | 7/1961 | Uhl | 153—79 X |
| 3,059,688 | 10/1962 | Colbert | 153—79 |
| 3,067,801 | 12/1962 | Sortor | 153—82 X |

JOHN F. CAMPBELL, *Primary Examiner.*

EDWARD V. BENHAM, RICHARD H. EANES, WHITMORE A. WILTZ, *Examiners.*

L. G. FOSTER, J. D. HOBART, *Assistant Examiners.*